July 30, 1935. J. B. JENSON Re. 19,658
GUARD FINGER AND LEDGER PLATE FOR MOWING MACHINES
Original Filed May 19, 1930
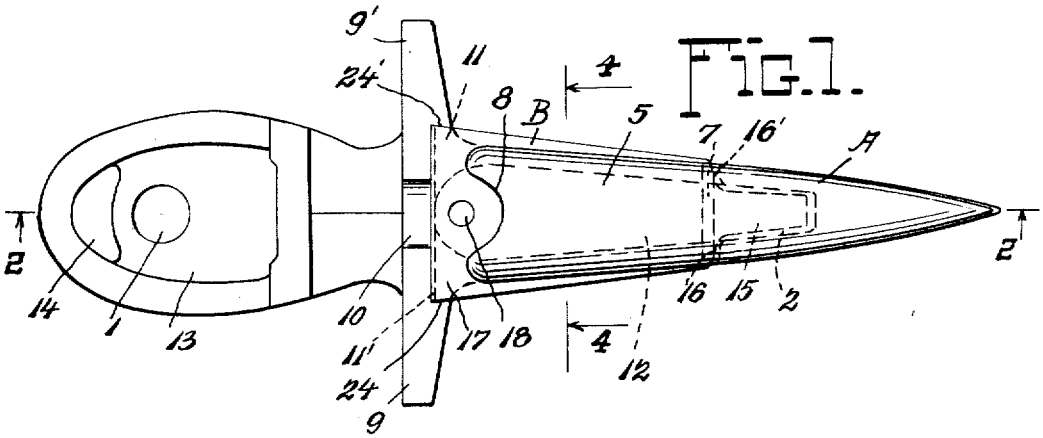
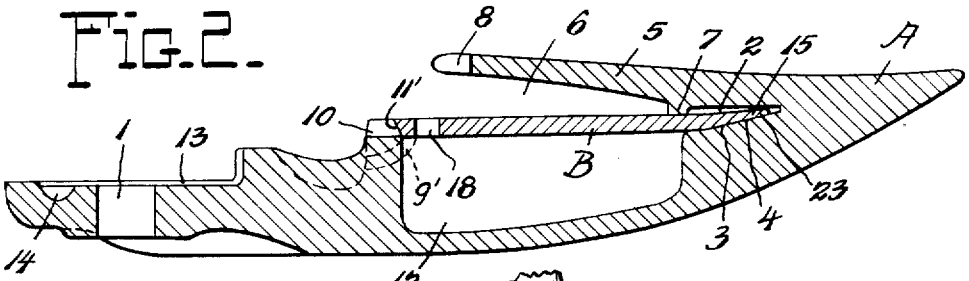
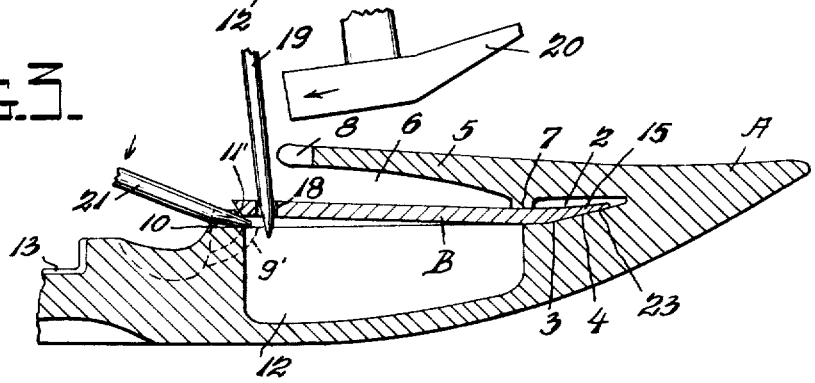
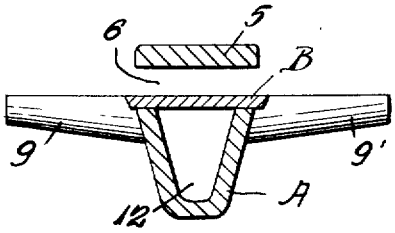
Fig. 4.
Inventor
J. B. Jenson.
By Robert Robb
Attorneys Reissued July 30, 1935 Re. 19,658

UNITED STATES PATENT OFFICE 19,658

GUARD FINGER AND LEDGER PLATE FOR MOWING MACHINES

James B. Jenson, Salt Lake City, Utah, assignor to D. O. Jackson, Salt Lake City, Utah Original No. 1,869,898, dated August 2, 1932, Serial No. 453,566, May 19, 1930. Application for reissue July 30, 1934, Serial No. 737,683

13 Claims. (Cl. 56—311)

This invention comprises novel improvements in guard finger and a ledger plate means adapted to be used as parts of the cutting apparatus of a mowing machine, or harvester.

The mowing machine comprises, as usual, the necessary instrumentalities to operate the cutting knife or sickle bar with its customary means for lifting and shifting the cutting apparatus. These details of the mowing machine are omitted from the drawing, as they form no part of this invention other than that they are used in combination with the guard finger and the ledger plate.

For the guard fingers such as now used, the ledger plate is either riveted to or fastened with screws to the guard finger. The known object of the ledger plate is to provide a cutting edge to meet the cutting edge of the knife or sickle bar mounted on the cutting apparatus, and reciprocating in the guard fingers through the instrumentalities for the actuating means.

It is well known that the ledger plate becomes dull and incapacitated through use, and also broken and nicked by coming into contact with gravel and rocks encountered in the movement of the mowing machine over the surface being mowed. The ledger plates under the above conditions must be removed and replaced by new ones, if the mowing machine is to perform its functions effectually.

To replace the ledger plates now commonly used is an irksome task, due to the rivets or screws, because rivets must be chopped off and driven out, and screws become rusted in the structure, and sometimes the heads are broken off in endeavoring to remove them.

The object of this invention is to overcome this difficulty, and to improve the mounting and removal of the ledger plates. In the practice of my invention, the ledger plates may be removed or mounted in a very short interval of time, and with very ordinary and simple tools, such as a punch, a chisel, or flat elongated piece of metal, or other suitable tool.

This invention is fully disclosed in the following specification, of which the accompanying drawing forms a part, in which the separate parts of my improvements are designated by suitable reference characters in each of the views.

Figure 1 is a top view of a guard finger with a ledger plate mounted therein.

Figure 2 is a longitudinal sectional view taken about line 2—2 of Figure 1, showing the means for connecting the ledger plate to the guard finger.

Figure 3 is a sectional fragmentary view of a guard finger and the ledger plate, showing the interposition of a tool therein and thereunder, with a hammer adjacent one of the tools, to illustrate the simple method of mounting or removing the ledger plate.

Figure 4 is a cross sectional view of the guard finger and ledger plate taken on line 4—4 of Figure 1 showing the relation of the ledger plate to the guard finger.

In the drawing forming a part of this specification I have shown the guard finger A, in which the ledger plate B is removably mounted therein. The guard finger is provided with an aperture 1, adapted to receive a rivet or other suitable member for the purpose of securing the guard finger in fixed relation to its associate part or parts of the mowing machine. Adjacent the pointed end of the guard finger there is provided a pocket or receiving socket 2, the lower wall or floor 3 of which is provided with a curvature or contour 4 leading upwardly in the guard finger A. The upper integral wall 5 of the socket inclines upwardly and backwardly and is so positioned that it forms a transverse slot 6 with the ledger plate B when mounted in the guard finger.

This transverse slot is provided to receive the sickle or knife that may be reciprocated therein. Adjacent the entrance of the pocket or receiving socket there is placed a downwardly extending and transverse rib 7; this rib is adapted to form a fulcrum or support against which the ledger plate rests when mounted in the guard finger and tending to force the rear end of the plate downwardly.

The upper wall 5 has also a semi-circular or other suitably shaped notch 8, adapted to permit the mounting of a tool used in mounting or removing the ledger plate. The guard finger is provided with laterally extending arms 9 and 9'. These arms provide a bearing surface for the sickle or knife. A notch or depression 10 is provided intermediate the arms, and of a depth equal substantially to the thickness of the ledger plate. A recess or depression 11 of a suitable configuration is provided in the guard finger for the reception on the rear extremity of the ledger plate. The wall 11' of the recess 11 is provided with an inclined face adapted to receive the complemental beveled face formed on the rear end of the ledger plate. The guard finger is also provided with a series of depressions 12, 13 and 14 to reduce the weight of the guard finger.

The ledger plate B is provided at one end with a reduced integrally formed portion 15, formed with the ledger plate shoulders 16 and 16'. The reduced portion is mounted in the socket 2, and the socket is provided to prevent lateral displacement of the ledger plate at this extremity. The other extremity or end 17 is suitably formed, and is mounted in the recess or depression formed in the guard finger provided for its reception. Lateral displacement is prohibited at this end by the squared shoulders, flanges, or ribs, 24 and 24', that form a part of the perimeter that bounds the socket or depression 11 formed for the ledger plate reception. An aperture 18 is provided in the ledger plate for the reception of a suitable tool 19, to be mounted therein, for the removing or mounting of the ledger plate B. 20 indicates a hammer in proximity to the tool 19, depicting its use in conjunction with the removing or mounting tool. 21 indicates a tool and represents vividly its position in removing the ledger plate, it being used as a lever to break the interlocking connection between the ledger plate and the guard finger. The ledger plate is slightly tapered as at 23, so that it will conform to the contour of the socket wall or floor.

In practice of my invention, if it is desired to remove a ledger plate, a tool is inserted in the depression 10 and pushed under the plate B, and forced downward in the direction of the arrow shown in Figure 3. This movement forces the plate up and over the angled or beveled end of the socket 11. The tool is next placed in the aperture in the ledger plate, and the tool is struck, thus releasing the plate from the socket 2 in the guard finger.

To mount the ledger plate, which is of spring metal, the plate is driven into the socket 2, and because of the special construction of the socket, and the end portion of the ledger plate, the end is caused to follow the curvature or contour of the bottom wall of the socket 2. This causes the other extremity to be sprung downwardly or take a downward position, when the plate has reached the limit of its movement in the socket 2. The other end or extremity is then lifted up and then forced down and into place in the socket prepared therefor. The beveled or angled edge of the ledger plate engages or springs against the complemental face former on the socket wall, adapted to interlock the ledger plate in the socket.

It will be apparent from the structure shown that the ledger plate is securely held in place by the resiliency inherently within itself, it being made of a spring steel plate.

It will be further noted that the top of the ledger plate is flush with the top of the arms 9 and 9'.

In accordance with the patent statutes I have set forth in a specific manner required thereby one complete embodiment of my invention, but it is to be understood that this is only for illustrative purposes and that the invention is capable of assuming other forms than that illustrated, and that the claims hereto annexed are not to be limited to the specific devices illustrated, except as is specifically recited therein.

I claim:

1. In combination, a guard finger provided with a socket, a resilient ledger plate for the guard finger and adapted to be inserted in the socket, the ledger plate having a configuration corresponding to that of the socket and snugly fitting therein, and means for interlocking the ledger plate in the guard finger, the socket being formed to maintain the interlocking action through cooperation with the inherent resiliency of the plate.

2. In combination a guard finger, provided with a socket having an upwardly curved bottom, a resilient ledger plate fitting into the socket, an inwardly extending rib on the top wall of the socket, the rib being adapted to form a fulcrum adjacent the entrance of said socket and exerting a downwardly directed force on the rear of the ledger plate, the said ledger plate having its end fitted into the socket shaped to conform to the bottom thereof, the ledger plate also cooperating with the said fulcrum rib when mounted in the socket, and means for interlocking the ledger plate in the guard finger.

3. In combination, a guard finger, provided with a forward socket having an upwardly directed bottom, a resilient ledger plate fitting into the socket, a transverse rib integral with the top of the socket and bearing against the ledger plate, the rib being positioned adjacent the socket entrance, the said finger being provided with a recess downwardly thereof to receive the rear extremity of the ledger plate, the ledger plate having a reduced and tapered forward end shaped to conform to the upwardly directed bottom of the socket, the said ledger plate bearing against the transverse rib, the end of the ledger plate being positioned in the said rear recess, and means for interlocking the ledger plate in the recess.

4. In combination, a guard finger, a ledger plate therefor, the guard finger being provided with a socket having an upwardly curved bottom, a downwardly extending rib formed in the top of the socket, and adjacent the entrance thereof, a ledger plate having a reduced and tapered end mounted in the said socket and bearing against the rib and bottom thereof, the finger having a recess rearwardly thereof having a beveled wall, and partial perimetrical vertical shoulders, the ledger plate having its rear end beveled to register with the beveled wall of the recess and interlocked therewith through the instrumentalities of the angled wall and partial perimetrical shoulders, and an opening in the ledger plate for the reception of a tool to break the interlock.

5. In combination a guard finger, a ledger plate therefor, the guard finger being provided with a socket having a depending rib adjacent the entrance thereof, the ledger plate having a reduced end portion mounted in the socket and bearing against the rib, a second socket remote from the first socket, the second socket being bounded by partial perimetrical squared shoulders and having a wall other than vertical, the said wall being provided with a depression intermediate its length adapted to provide an opening whereby a tool may be introduced under the ledger plate, the ledger plate being mounted in the socket, and provided with an angled face and interlocking with the wall other than vertical, and being laterally limited by perimetrical squared shoulders, the ledger plate being interlocked in the second socket by pressure exerted by the rib upon the plate and by the inherent resiliency of the plate.

6. As a new article of manufacture, a guard finger for use with a mowing machine, the guard finger being provided with a socket having an upwardly curved bottom, a fulcrum rib adjacent the entrance of the socket depending from the top wall thereof, a second socket formed remote therefrom and having a rear wall at an angle, and bounded by partial perimetrical vertical shoulders, arms extending therebeyond, and a portion having an aperture therein whereby the same may be secured to the mowing machine.

7. In combination a guard finger, a resilient ledger plate therefor, the guard finger provided with a socket, the socket having a rib adjacent the entrance thereof, a top wall extending backward from the socket, and provided with a notch in the end thereof, the ledger plate having a reduced and tapered end, the end mounted in the socket, and the ledger plate cooperating with the rib and socket, the guard finger being provided with a second socket remote from the first socket, the said second socket having an angled wall and oppositely disposed vertical shoulders, the angled wall having a depression intermediate its length adapted to provide a depression whereby a tool may be introduced under the ledger plate, the ledger plate being resiliently secured in the socket and interlocking therewith through a complemental end on the ledger plate and the shoulders, cavities in the guard finger adapted to lighten the device, and an aperture in the guard finger adapted to receive a securing device.

8. In combination, a guard finger provided with a socket having a portion of contoured configuration in the forward end of the guard finger, the finger being also provided with a second socket remote from the first socket, a ledger plate comprising a body of resilient metal having a reduced end portion mounted in the contoured socket and deflected thereby, the other end of the ledger plate formed to fit within the remote socket, and held when mounted therein by the resiliency of the ledger plate.

9. In combination, a guard finger provided with a socket in the forward end of the guard finger and having a rib formed at the entrance thereof, a ledger plate comprising a body of resilient metal having a reduced end portion mounted in the socket, the finger being also provided with a second socket remote from the first socket, the other end of the ledger plate formed to fit within the remote socket, the ledger plate being operatively related to the rib and deflected thereby, the ledger plate being held when mounted in the remote socket by the resiliency of the ledger plate.

10. In combination, a mowing machine guard finger provided with a ledger plate engaging socket, and a resilient ledger plate engaged at one end with said socket and placed under tension thereby, the finger having means to interlock with the other end of the plate and maintained so interlocked by the spring tension under which the plate is placed without other fastening means.

11. In combination, a guard finger, a ledger plate therefor, a socket having an upwardly contoured lower floor, the ledger plate mounted in the socket and having an end cooperating with the contoured lower floor, and means for interlocking the ledger plate in the guard finger.

12. In combination, a guard finger, a ledger plate therefor, a socket having a contoured lower floor, a transverse rib thereabove and positioned adjacent the socket entrance, a second socket remote therefrom, the ledger plate having a reduced and tapered end, said end mounted in the socket having the contoured floor, and cooperating with the transverse rib, the other end of the ledger plate mounted in the remote socket, and means for interlocking the ledger plate in the remote socket.

13. In combination, a guard finger, a ledger plate therefor, a socket having a contoured floor, a rib thereabove and adjacent the entrance thereof, a ledger plate having a reduced and tapered end mounted in the said socket and cooperating with the rib and floor, a remote socket having a wall at an angle, and partial perimetrical vertical shoulders, the ledger plate having a registering configuration mounted in the socket and interlocked therein through the instrumentalities of the angled wall and partial perimetrical shoulders, and an opening in the ledger plate for the reception of a tool to break the interlock.

JAMES B. JENSON.